United States Patent

Baldwin

[11] Patent Number: 5,809,627
[45] Date of Patent: Sep. 22, 1998

[54] MANUFACTURE OF BONDED ARTICLES

[75] Inventor: Douglas Baldwin, Buxton, England

[73] Assignee: G B Tools & Components Exports Limited, United Kingdom

[21] Appl. No.: 537,920
[22] PCT Filed: May 12, 1994
[86] PCT No.: PCT/GB94/01014
§ 371 Date: Nov. 1, 1995
§ 102(e) Date: Nov. 1, 1995
[87] PCT Pub. No.: WO94/27059
PCT Pub. Date: Nov. 24, 1994

[30] Foreign Application Priority Data

May 15, 1993 [GB] United Kingdom ............... 9310031

[51] Int. Cl.$^6$ .................... B23P 11/00; C09J 5/06
[52] U.S. Cl. .................... 29/458; 29/469.5; 156/212; 156/307.3; 156/475; 156/583.1
[58] Field of Search .................... 29/458, 469.5; 156/87, 212, 215, 275.5, 273.7, 288, 307.3, 475, 476, 583.1

[56] References Cited

U.S. PATENT DOCUMENTS

| 2,452,284 | 10/1948 | Beare . |
| 2,690,820 | 10/1954 | Raes . |
| 4,173,681 | 11/1979 | Durrieu et al. . |
| 4,193,956 | 3/1980 | Kalnins ............... 156/275 X |
| 4,452,346 | 6/1984 | Stukenborg . |
| 4,701,378 | 10/1987 | Bagga et al. ............... 156/307.3 X |
| 5,595,266 | 1/1997 | Cecere . |

FOREIGN PATENT DOCUMENTS

| 0 443 093 A1 | 8/1991 | European Pat. Off. . |
| 2 389 030 | 4/1977 | France . |
| 2 025 826 | 12/1971 | Germany . |
| 137 466 | 9/1979 | Germany . |
| 367176 | 2/1931 | United Kingdom . |
| 655842 | 1/1948 | United Kingdom . |
| 1 336 000 | 10/1973 | United Kingdom . |
| 1 370 261 | 10/1974 | United Kingdom . |
| 1 391 962 | 4/1975 | United Kingdom . |
| 1 401 850 | 7/1975 | United Kingdom . |
| 1 593 804 | 7/1981 | United Kingdom . |

OTHER PUBLICATIONS

Patent Abstracts of Japan JP55138055 Oct. 1980 vol. 5 No. 12 "Sintered Alloy having lubrication function preparation of the same, and friction mate–material using the same".

Primary Examiner—S. Thomas Hughes
Attorney, Agent, or Firm—Nixon & Vanderhye P.C.

[57] ABSTRACT

A brake shoe, in which a friction lining is secured to a platform of a shoe body solely by a thermosetting adhesive resin cured at elevated temperature, has a friction material including fibrous reinforcement materials and an uncured thermosetting binder, roll formed to define a green lining element which is sandwiched with the adhesive between the platform and a bearing surface that applies small constraining pressure by way of the major faces but not minor faces. The resins of the adhesive and lining element are cured together in situ on, and into intimate conformity with, the platform. The constraining pressure is preferably long enough to overcome any tendency for the curing friction material to expand in thickness or fall in density due to evolution of gases therein, by easy escape of gases from the unconstrained minor faces permitting the small constraining pressure on the major surfaces. To effect an increase in density of the lining by way of a decrease in thickness with only small changes of the minor faces.

18 Claims, 2 Drawing Sheets

MANUFACTURE OF BONDED ARTICLES

TECHNICAL FIELD

This invention relates to the manufacture of bonded articles and in particular to the manufacture of friction elements of the so-called bonded type in which a friction lining is bonded to a platform of a carrier or body solely by a cured thermosetting resin adhesive substance.

BACKGROUND

The invention is particularly, but not exclusively, applicable to friction elements comprising brake shoes of the cylindrically curved drum type. It is, however, also applicable to friction elements comprising brake shoes of the generally flat disc type and to friction elements of similar types used within a clutch arrangement. Accordingly, in this specification, the term "shoe" is used principally to describe a carrier or body structure having a cylindrically curved platform on which such a cylindrically curved lining is carried, but within its general sense is also intended to include a structure having a substantially flat platform or backplate on which a corresponding flat friction lining is carried for engagement by a flat surface of a disc or the like, notwithstanding the use of a carrier or body of either form with a friction lining analogously in relation to a clutch arrangement.

Friction elements in which the friction lining is adhesively bonded to the body are employed for example in the form of brake shoes for light vehicles and similar uses and are distinguished from friction elements in which the lining is secured to the platform by mechanical location with interlocking parts, such as rivets, clips, plugs and the like.

This specification is concerned only with such shoes of the bonded type but the invention disclosed herein is best understood and placed in perspective as a result of some consideration of their manufacture in relation to mechanically located linings as well.

Mechanically located linings, which may in addition be adhesively bonded, require a greater number of manufacturing steps but may be preferred when the size/cost of the shoe body and platform requires its re-use with a new lining and/or the braking shear forces are of such magnitude as to require more security than adhesive bonding alone has been considered able to provide.

Where operating conditions and cost factors permit the use of adhesively bonded linings, such shoes enable manufacture to be effected more cheaply, at least in respect of securing the brake lining to the shoe platform, but reduced costs have not always been realized, particularly as production of the brake friction lining itself is generally performed similarly for both types.

It is known to form friction linings from a variety of friction modifying materials held in, and bound by, a matrix of, inter alia, thermosetting liquid resin, such as a phenolic resin, nitryl rubber copolymer matrix, reinforced with various fibers and cured to define an essentially rigid structure.

It is also known to produce for use with a shoe body having a cylindrically curved platform an arcuate friction lining segment including such liquid resin material, in a plastic state and roll-formed to generally align the reinforcement fibers and to define the thickness and density of the material and curvature of the lining prior to curing the resin matrix at elevated temperature. In a roll formed friction lining element in which the reinforcement fibers tend to be substantially parallel to the major faces and which in a green form has a density less than the theoretical maximum due to interstitial voids, subjecting the element to elevated temperature to cure the resin matrix causes the element to swell or expand due to evolution of gases and vapors from volatile constituents (including water), and to some extent by oxidation of some constituents, and reduce in density as the resin matrix cures to a solid, notwithstanding that before cure is complete, some gasses and vapors force their escape from the surface and disrupt the structure.

There is a preferential expansion ion the direction in which the fibers are aligned and with a tendency to expand in a direction of minimum dimensions, so that the practical effect on such a lining element is a tendency to increase in thickness and reduce in density.

It is also known that by effecting curing under pressure whilst permitting escape of such vapors, the density of the cured element can be increased or reduced to a controlled extent as a function of the pressure applied with a corresponding change in volume whilst preserving the integrity of the lining structure.

In respect of the lining element, it is the density and thickness of the cured lining which are of prime consideration, and to this end the lining material is normally cured in a mold or press with modest pressure exerted on the major faces of the rolled material to maintain the integrity of the cured, essentially rigid material with a slightly increased density. Although the cured lining is essentially rigid and the material is able to withstand considerable compressive loading, if its length is significantly in excess of its thickness a small degree of resilience is usually exhibited along its length.

Cured arcuate linings may be produced by roll forming and curing individually, or individually cut from an extensively cured arcuate sheet, but however produced, the rigid linings are machined in respect of the major and minor faces in order to define the final dimensions and curvature of the lining for securing to the shoe platform.

The forming and machining processes have been common to linings to be secured by bonding or by riveting and driven not only by the need for dimensional accuracy to achieve optimum support on the platform, but also to prepare the lining for accurate drilling of rivet apertures or the like in the latter type.

To effect bonding of the cured lining to the platform of the shoe body, the platform or the radially inner major face of the dimensioned lining is coated with a thermosetting resin adhesive, often also phenolic based, the lining being pressed into position in contact with the shoe platform of corresponding, or slightly larger, radius of curvature to ensure alignment, and full adhesive contact, between the lining and platform.

The lining may be pressed by way of a generally conforming or conformable bearing surface such as a flexible metal strip, possibly as an assembly in which a flexible band extends about a pair of such shoes disposed back-to-back, and this assembly is passed through a heating station, such as a curing oven, to raise the temperature of the adhesive resin and effect curing thereof, with pressure applied to the lining surface.

An example of such a bonding assembly for the manufacture of bonded brake shoes is described in patent specification GB-A-1370261, a pair of shoe bodies in back-to-back relationship being forced apart to sandwich linings between platforms and a flexible band.

An analogous bonding assembly in which a shorter flexible strip, anchored at its ends, is pressed against a single platform carrying a lining and adhesive, is described in patent specification DD-A-137466.

Alternatively to such a flexible strip, a lining made up from lining blocks may be pressed against a shoe platform by a more rigid bearing surface than is offered by such flexible strip or band, an example being described in patent specification GB-A-1391962.

It is clear from the prior art that the lining as bonded to the shoe platform may comprise a single block of friction material or comprise an assembly of shorter blocks. For convenience in this specification the terms "lining" and "lining element" are employed in the singular, notwithstanding that unless the context dictates otherwise, a plurality of linings or lining elements may be employed.

The prior art also makes clear the need for considerable pressure to be exerted on the cured, rigid lining to ensure best conformity with the platform and that no gaps exist between lining and platform that are not filled by the adhesive resin. Any such gap clearly decreases the area bonded and thus the strength of the bond.

To mitigate such effect with a platform that is not uniformly smooth and take account of profile variations due to manufacture of the shoe body, it has been necessary to have a suitably thick deposit of adhesive resin within the constraints of avoiding unbonded regions where the lining overlies joints in the shoe body whilst not being so thick as to hold the lining away from the platform and/or exude from the edges under bonding pressure.

In order to satisfy requirements for bedding-in the lining in operation and to minimize any problems caused in use by inadequate bonding at the ends of the lining, the bonding pressure may be unequally applied along the length of the lining; additional pressure may be caused to be exerted in the end regions during curing by way of the strip effecting a slightly smaller radius of curvature than the radially outer face of the lining and/or by having a platform radius of curvature slightly larger than the radially inner face of the lining and springing apart the ends of the essentially rigid lining by applying additional pressure to its central region. It is thus accepted that in practice a pressure of the order of 0.685 to 1.03 Mpa (100–150 Psi) may be required between the shoe body and lining bearing surface of the strip of a light duty lining.

It will be appreciated that although the bonding of the lining to the shoe platform involves relatively few steps, the production and preparation of the lining involves considerable effort in terms of molding accuracy and/or machining work to ensure a good fit to the shoe. Notwithstanding the expenditure of skill and effort in such operations, there is the production of dry waste material and dust which is lost from use and has to be dealt with in the working environment. Whilst such a situation may be inevitable where apertures have to be drilled in a cured lining for riveting it is perceived to be a limitation in the cost-effective production of brake shoes with adhesive bonded friction linings.

In order to avoid the molding and inevitable machining steps associated with producing a cured resin friction lining and securing it effectively to a platform, it has been suggested, in U.S. Pat. No. 4,452,356, that a lining element which is fully densified, but of otherwise undefined form (except that the thermosetting resin matrix is uncured), may be disposed on an apertured platform and punched to displace parts of the element into the apertures to effect a mechanical interlock that retains the lining in relation to the platform both during and after curing of the resin at elevated temperatures, with or without an additional layer of thermosetting resin adhesive intermediate the undisplaced parts of the element and the platform. Although aimed at the elimination of molding devices in the curing of the lining resin, any advantages thereof appear illusory in practice by the use of a fully densified friction material, generally considered unacceptable by reason of the generation of high noise levels in braking operations, and by mechanical interlocking of the lining with the platform, albeit with material integral to the lining, which negatively impacts the assembly simplicity normally associated with a solely bonded lining.

It has therefore been accepted that in order to have a bonded brake shoe in which the lining has a less than fully dense lining, in accordance with known criteria in the art relating to operating noise, longevity and braking performance, the rigid cured lining of the desired density has to be produced separately in order to provide the desired properties and only then made suitable (dimensionally) for bonding to the shoe platform under conditions of heat and pressure.

SUMMARY OF THE INVENTION

Preserving the generality of the foregoing as to the form of shoe, it is an object of the present invention to provide a method of more effectively manufacturing a friction element that includes a carrier having a rigid friction lining, formed of a partly densified roll-formed material including a thermosetting resin, bonded thereto by thermosetting adhesive bonding. It is also an object of the present invention to provide an arrangement for manufacturing a bonded friction element in a more cost effective manner. It is a further object of the present invention to provide a novel and improved bonded friction element.

According to a first aspect of the present invention, a method of manufacturing a bonded friction element comprising a) producing a carrier having a platform;

b) producing a plastic friction lining element including fibrous reinforcement and friction modifying materials in a matrix of an uncured thermosetting resin binder disposed between major faces defining its thickness and minor surfaces between and perpendicular to the major forces;

c) rolling the friction lining element with the fibrous materials orientated between the major faces to define a predetermined rolled thickness and density;

d) depositing a thermosetting adhesive resin on at least one of a major face of the lining or the platform;

e) disposing one of the two major faces of the lining element adjacent the platform with the thermosetting adhesive resin between, and in contact with, the element and the platform;

f) sandwiching the adhesive and lining element between the platform and a co-operative bearing surface bearing on the other one of the major faces, such that the minor surfaces are exposed;

g) curing the resins of tooth adhesive and lining element at elevated temperature whereby the cured lining is rigid and bonded to the platform; and h) during the curing, applying constraining pressure to the lining element by way of the major faces to define the density of the cured resin lining and position of the other major face in relation to a defined part of the carrier.

According to a second aspect of the present invention, an arrangement for producing a bonded friction element in which a friction lining is secured to a carrier platform by bonding, comprising support means arranged to support a the platform; restraining means including a bearing surface arranged to face the platform and hold one of a pair of major faces of the friction lining against the platform by way of a layer of thermosetting adhesive resin by bearing against the other of the pair of major faces of the friction lining, the restraining means receiving in bearing relationship with the bearing surface, the other major face of the plastic lining that is less extensive than the bearing surface and formed of an uncured thermosetting resin matrix containing reinforcement fibers and friction modifying materials roll formed to define a predetermined density and thickness between the major faces; forcing means for applying a relatively small bias force between the platform and bearing surface of the restraining means to press the friction lining, adhesive resin and platform into contact over the major faces of the friction lining, the forcing means being arranged to induce constraining pressure on the major faces only of the friction lining and, during curing of the thermosetting resins of the adhesive and friction lining in situ on the platform, constrain the thickness of the friction lining and define a final density of said friction lining; and heating means for heating at least the platform, adhesive resin and friction lining pressed by the forcing means to a predetermined temperature for a predetermined time to effect curing of the adhesive resin and bonding of the friction lining to the platform, the heating means being arranged to heat the platform, adhesive resin and friction lining to a temperature and for a time appropriate to curing the resins of both the adhesive and the friction lining element contemporaneously.

According to a third aspect of the present invention, a bonded friction element including a carrier having a generally cylindrical platform, said platform having a surface including one or more closed indentations facing in a generally radial direction, and a friction lining, formed of a thermosetting resin matrix containing reinforcement fibers and friction modifying materials roll formed and cured to rigid form, retained with respect to said platform surface by a cured thermosetting adhesive resin intermediate the friction lining and platform, the adhesive resin being present as a thin film conforming to the surface profile of the platform and each indentation thereof and the lining having an interface with the film that is coextensive with the area of the major face of the lining and in intimate conformity with the surface profile of the platform due to radially constrained curing of resin matrix of the lining element in situ on the platform.

Embodiments of the invention will now be described by way of example with reference to the accompanying drawings, in which:

BEST MODE FOR CARRYING OUT THE INVENTION

Figure 1:
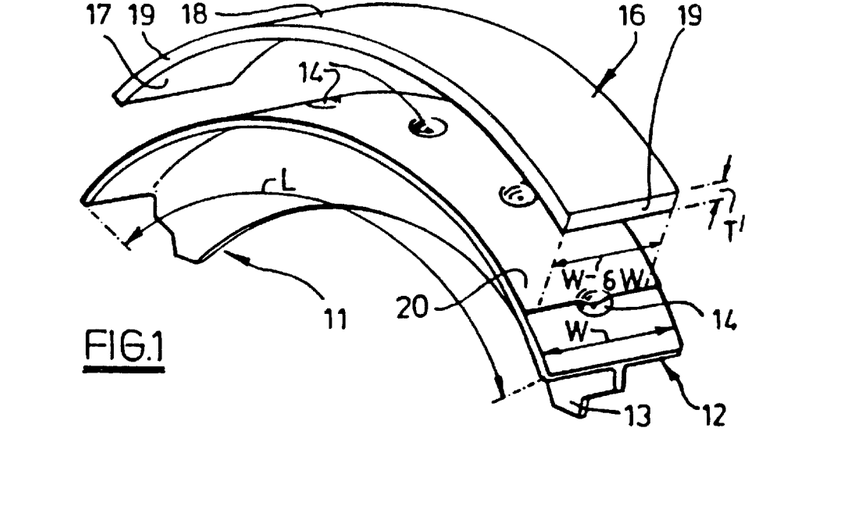
FIG. 1 is a perspective view of components employed in relation to a bonded friction element in accordance with the invention, in the form of a brake shoe illustrating relative dimensions and juxtapositions of a shoe body having a cylindrically curved platform and uncured lining element.

Referring to FIG. 1, the component parts of a friction element in the form of a bonded brake shoe of the type used in a drum brake are shown. A carrier or shoe body 11 formed of steel comprises a cylindrically curved platform 12 which forms a section of a notional right circular cylinder, having an arc length L in the direction of curvature and being substantially flat of width W in a transverse direction parallel to the longitudinal axis of the notional cylinder defining the curvature.

The shoe body also comprises a substantially planar bracing web 13 which extends perpendicularly to the platform as a central spine and to the edge of which web the platform is welded at intervals along its length to define the curvature. In order to preserve a platform surface with no upstanding projections at said welding points, or other features, the platform surface is interspersed with indentations or recesses 14 containing said points or features.

The shoe body is conventional in structure and may conform with conventional variants, such as the platform being divided along its length and assembled from two "half-platforms" welded to the web. Notwithstanding the precise structure, it is typical that the effective flat platform surface is less than the nominal area L×W, such that when employed in a conventional bonded shoe, a bond is not made where such recesses exist unless a thick layer of bonding adhesive fills, but not overfills, such recesses.

In addition to the shoe body, the components include a friction lining element 16. The lining element is conventional in including friction modifying materials and reinforcement fiber in a phenolic resin, nitryl rubber copolymer matrix.

The lining element is produced in conventional manner by admixing the ingredients and partly curing the resin matrix to a handleable plastic consistency and rolling to define a predetermined density D' and dispose the fibrous materials in alignment with major faces 17, 18 that define its rolled thickness T' manifested by minor faces 19. The rolling also includes a radius rolling step whereby the lining element assumes a generally cylindrical curvature corresponding approximately to the curvature of the platform.

The density D' of the lining element is typically 95% of the density D required of the lining when the resin is cured and it is bonded to the shoe platform, that is, $D=(D-\partial D)$. As indicated hereinbefore, the density required of the final lining is less than the theoretical maximum density, typically of the order of 95%, so that the rolled material may have a density of 90% of being fully densified.

Likewise, the rolled thickness T' at this lower density is correspondingly greater than the desired final thickness T to allow the change in volume to produce said change $\partial D$ in density by way of a reduction in thickness, that is T'=(T+$\partial$T).

The lining element may be rolled to thickness and curvature as an individual lining or may, more typically, be produced as a large sheet from which each element is cut with appropriate dimensions of length and width and to this end, and in accordance with traditional practice, the reinforced fibers are aligned generally in a widthwise direction in each element.

However, whereas the lining element would normally be heated with pressure applied to the major (curved) faces to cure the resin binder into an essentially rigid liner (or more usually a curved sheet from which individual linings are then cut across the direction of fiber alignment to final size of length L and width W to fit the platform) and the major surfaces machined to appropriate dimensions and surface finish, in accordance with the present invention the lining element 16 is employed in its uncured or green state and furthermore, is dimensioned to have a length (L-$\partial$L) and width (W-$\partial$W) for reasons discussed hereafter.

The final component of FIG. 1 is a layer of bonding adhesive 20, in the form of a conventional phenolic based thermosetting resin used in manufacturing bonded brake shoes, interposed between the lining element and the shoe platform. However, whereas it is conventional for such a layer to be applied at the time of assembly to either or both of the platform surface and surface of the (cured, rigid) lining in such thickness as to ensure that no voids exist between them to decrease the bonded area, in accordance with the present invention the adhesive resin is disposed as a thin film only. Furthermore, it is preferable, but not essential, that the film is applied to the steel platform at the time of shoe body manufacture as a protective primer coating that conforms to the surface of the platform, including any recesses 14 or the like, and is thereafter dry to touch at ambient temperatures without being fully cured.

A bonded brake shoe is manufactured from the above described components by disposing the one major face 17 of the lining element adjacent the adhesive coated platform 12 and sandwiching the adhesive 20 and lining element 16 between the platform and a cooperatively curved bearing surface bearing on the other major face 18 of the element, such that minor faces 19 are exposed, and curing the resins of both adhesive and lining element at elevated temperature, during said curing, applying constraining pressure to the lining element by way of the major faces to define the defined part of the shoe body. Typically, but not necessarily, the defined part of the shoe body is the platform such that the position of the major face 18 in relation thereto is the thickness T of the cured lining.

As indicated above, in respect of the lining element it is the density and thickness of the cured lining which are of prime consideration with dimensions of width and length of slightly less import, provided the lining does not extend beyond the boundaries of the platform or depart from a specified acceptable surface area.

In accordance with the present invention, the bearing surface and platform subject the lining to such a constraining pressure between its major faces as to overcome any internal pressure due to gas evolution or expansion of trapped gases within the plastic (but not fully dense) material when it is heated to cure the resin and to cause such gases to be expelled by way of the exposed minor faces and effect, by way of a decrease in thickness of the softened material, an increase in density to the desired final value.

However, insofar as pressure is applied by way of the major faces to effect such an increase in density by a reduction in volume, there is a tendency for the reduction in thickness which brings it about to be accompanied by some increase in the unconstrained width due to not only to the internal pressure generated by the constraining pressure but also the internal pressure of curing.

By having a bearing surface that extends parallel to the platform surface beyond the edge of the lining element in both length and width, unconstrained by predictable expansion of the lining elements in those directions increases the dimensions of the lining by the aforementioned $\partial$L and $\partial$W, respectively, to the predetermined values of L and W for the finished lining.

It will be appreciated that the resin matrix prior to curing may become quite soft and that a pressure at a level that may initially be required to effect increase in density may also, if continued, increase in the density beyond a desired value, that is create a fully dense lining, and/or cause the softened resin to flow laterally of the bearing surface, that is, by way of the minor faces and reduce the thickness of the dense material even further.

According, the pressure is arranged to act only over said predetermined reductions $\partial$T in thickness, either by being inhibited from acting further by an abutment or the like when the desired thickness T is achieved, or by reducing in magnitude as a function of thickness reduction to reach a level, at the prescribed lining thickness T, at which it is in equilibrium with internal pressures. Whichever method is employed it is to be realized that the lining element is reduced in thickness substantially only to the extent that density is increased.

It has been found that despite being unconstrained, the expansion in width and length, that is, of the minor faces, is predictable for particular formulations, curing temperature, lining element density (D-$\partial$D) and thickness (T-$\partial$T) and constraining pressures applied to the major faces. Accordingly, for any particular final lining dimensions L and W, it is readily possible, with minimal trial and experimentation, to determine the dimensions (L-$\partial$L) and (W-$\partial$W) for the green lining element, and unconstrained expansion of the order of 5% is typical.

It will be appreciated that notwithstanding the constraint on expansion that limits the position of the major face 18 with respect to the platform, that is, radially with respect to the axis of the cylinder of which the platform is a part, the major face 17 is able to expand where it overlies any recesses 14 or the like in the platform surface such that the cured lining has its major face 17 in intimate conformity with the surface profile of the platform, and thus bonded by way of the conforming film of adhesive resin primer over the maximum possible area.

Figure 2:
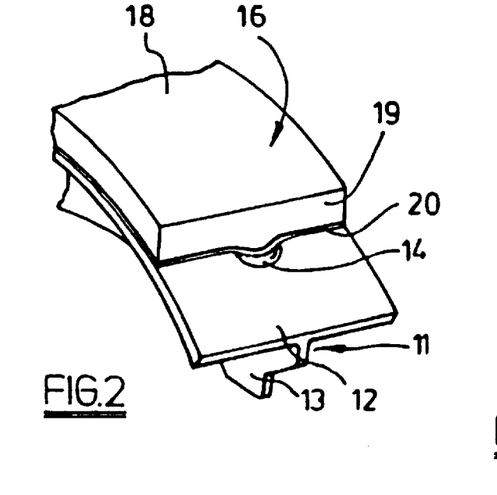
FIG. 2 is a partly cut-away, perspective view showing a bonded brake shoe in accordance with the invention.

FIG. 2 shows in partly cut-away perspective view the bonded brake shoe that results from such manufacture.

It is clearly a matter of choice and experience with the behavior of specific lining element formulations, dimensions, curing temperatures and duration to determine what constraining pressures are most suitable for particular combinations of potential variables which may be manipulated independently or in interrelated manner to arrive at the desired lining properties of density and dimensions.

In accordance with the outlined aims of providing a bonded brake shoe more cost effectively, the elimination of manufacturing steps involved in, and consequent upon curing the lining element separately from the bonding operation may be augmented by exploitation and adaptation of apparatus of the type hitherto used for bonding essentially rigid cured linings onto the body platforms.

Figure 3A:
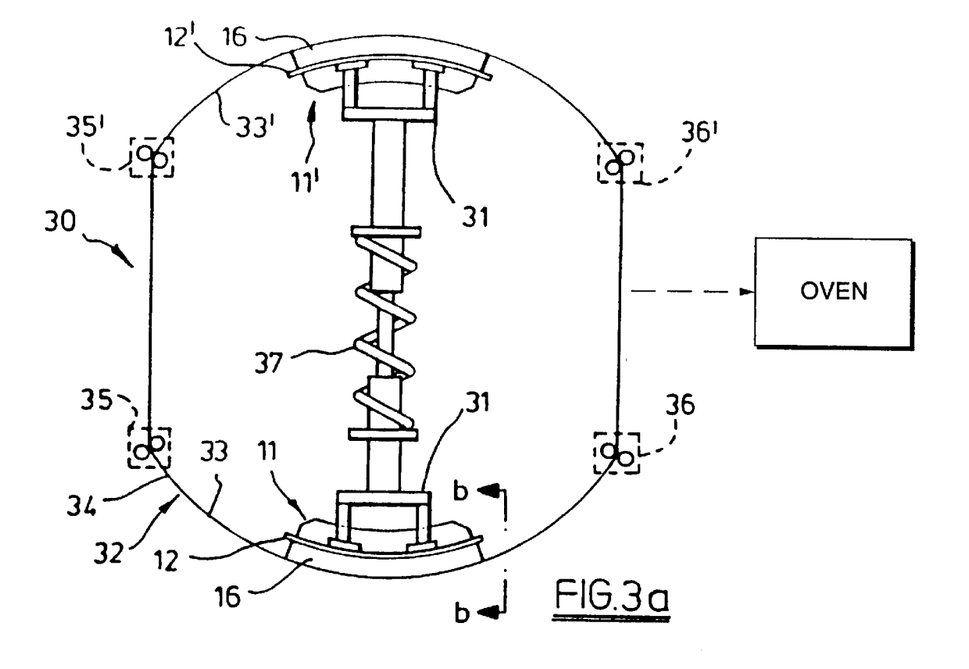
FIG. 3(a) is a schematic elevation view of an arrangement in accordance with the present invention for manufacturing a bonded brake shoe from the components of FIG. 1, including a bearing surface in the form of a flexible inextensible strip.
Figure 3B:
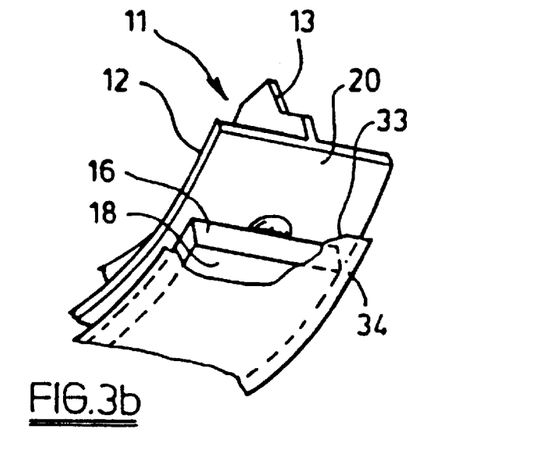
FIG. 3(b) is a partly cut-away perspective view, taken at b—b of FIG. 3(a), illustrating relative disposition of component and strip prior to curing of the lining element.

Referring to FIGS. 3(a) and 3(b), an arrangement 30 for producing a bonded brake shoe as shown in FIG. 2 in accordance with the present invention comprises support means 31 for supporting a shoe body 11, with its cylindrically curved platform 12, adhesive layer 20 and lining element 16. Restraining means 32 includes as bearing surface 33 cooperatively curved with respect to the platform 12, formed by a flexible inextensible strip 34 of stainless steel or the like, supported at spaced apart locations 35, 36 to define therebetween an arc of a circle of length greater than the lining to be formed from element 16 and of radius corresponding to the radius of the other major face 18 of the lining. The width of the strip is of the same order of magnitude as the platform but in any event arranged to bear against a major face 18 which is narrower, as illustrated by the cut-away perspective view in FIG. 3(b).

The flexible strip 34 conveniently comprises a complete band caused to pass through the support locations 35, 36 and a corresponding further pair 35', 36', and the support means 31 is arranged to support a pair of shoe bodies, 11, 11' in back-to-back relationship with their platforms 12, 12' facing away from each other towards respective bearing surfaces 33, 33' defined by the inner surface of the band.

Forcing means 37, such as spring means, is arranged to force the shoe bodies apart from each other towards their respective bearing surfaces whereby the lining element, adhesive resin and platform of each is pressed into contact over the major faces of the lining elements. Furthermore, the forcing means is arranged to provide a force-displacement characteristics that for each shoe operates over a very small range of distances of the order of the said $\partial T$ whereby maximum constraining pressure is applied to the green lining element at the start or curing with the platform and distance (T+$\partial T$) from the bearing surface but is reduced significantly as the lining thickness reduces under said pressure during curing as the platform approaches a distance T from the bearing surface. As discussed above, because the resin of each lining element is uncured and thermoplastic until cross-linking occurs, only a small bias force is applied, even initially, consistent with producing said constraining pressure at each lining.

The arrangement further comprises heating means for heating at least the platform, adhesive resin and lining elements to a predetermined temperature for a predetermined time. Conveniently, the heating means comprises an oven which the whole assembly of support means, restraining means and forcing means can be passed. If necessary, the forcing means may be adapted to accommodate any tendency for the constraining pressure to change due to thermal expansion of the restraining or forcing means.

It will be appreciated that the arrangement is similar to an arrangement for bonding pre-cured linings onto a pair of platforms but unlike such prior arrangement, wherein the forcing means applies a relatively large bias force with little or no displacement relative to the shoe platform because of the rigidity of the lining, the forcing means is arranged to provide only said relatively small initial bias force which varies as a function of position to generate the constraining pressure, the shape of the strip is constrained to run parallel to the platform so s to provide uniform constraining pressure and is wider than any lining element to be constrained thereby.

However, because of the existence in such similar arrangement of complete supporting means, restraining means, forcing means and programmed heating means for the curing of the adhesive resin, it is convenient for the arrangement in accordance with the present invention to make use of such facilities and existing operating parameters and also to employ heating to the same or similar temperature for the same or similar time interval, and for the other variable parameters to be selected to work in conformity with these existing parameters.

For example, a typical rolled friction material, when pre-cured to a lining thickness of 6 mm, is bonded to a platform under a restraining pressure of 0.68–1.03 Mpa (100–150 Pi) whilst the temperature is raised to 200°–250° for 20–40 minutes; in accordance with the present invention, the same friction material (to a rolled green thickness of about 6.3 mm) may be cured and bonded in situ at the same temperature and in the same time interval under a constraining pressure of initially 0.1–0.34 Mpa (15–50 psi), preferably in the range 0.17–0.2 Mpa (25–30 psi) decreasing in the process by about 5% to a final thickness of about 6 mm and increasing in unconstrained width by less than 5%. Thus, a lined shoe is produced with a more satisfactory bond interface utilizing less adhesive resin at much lower constraining pressures and avoiding the additional steps necessary with pre-curing the lining, whilst only readily implemented modifications to existing bonding apparatus are required to effect a suitable bonding arrangement.

It will be seen that notwithstanding the radius rolling of the green material to a curvature substantially conforming to that of the platform, there is no requirement for precise matching of the curvatures as the lining element is plastic under the action of the constraining pressure at ambient and initial curing temperatures and is readily disposed to take the curvature of the platform, notwithstanding that curing inherently causes the major face to conform intimately with the platform.

It will be appreciated many variations may be effected in respect of process variables in producing the rolled lining element and effecting its curing and bonding together in situ on the platform. Although, as described above, the constraining pressure is such as to effect an increase density of the lining, as also discussed hereinbefore, it is possible to have constraining pressures which are initially equal to or less than the internally generated pressures, respectively maintaining the density of the green lining element unchanged or permitting it to reduce in density and expand in thickness as it cures.

In practice, it has been found that by control of the constraining pressure, it is readily possible to effect in a rolled green lining element having a density in the range of 85–92% of the theoretical density a change in density of between –5% and +10% by choice of constraining pressure between 0.03 Mpa (5 psi) and 0.68 Mpa (100 psi).

In the arrangement 30 described in relation to FIG. 3(a), the support means 31 supports the shoe body such that platform 12 is disposed parallel to the bearing surface and the forcing means acts on the shoe body by way of the platform to maintain the parallelism and define a uniform separation between bearing surface and platform that gives a uniform lining thickness both along the length of, and across the width of, the platform. It will be appreciated that in operation within a brake, the operative alignment of the shoe with respect to a brake drum may be defined by way of the bracing web 13, that is, with the drum surface extending perpendicularly to the plane of the web, and that although the platform is nominally perpendicular to the web in a widthwise direction, it may not be so in practice. As a result the surface of a lining defined by the constraining means and support means parallel to the platform may not contact the drum properly across its width until a considerable amount of lining has been worn away.

Figure 4A:
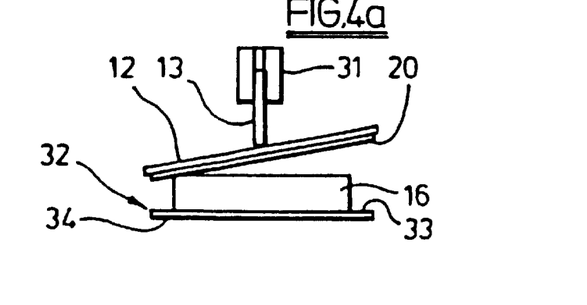
FIGS. 4(a) and 4(b) are schematic cross-sectional views through an alternative form of arrangement generally similar to FIG. 3(a) but in which the shoe body is supported by a bracing web not perpendicular to the platform, and illustrating respectively by gross exaggeration the disposition of lining element and lining before and after curing the lining element.
Figure 4B:
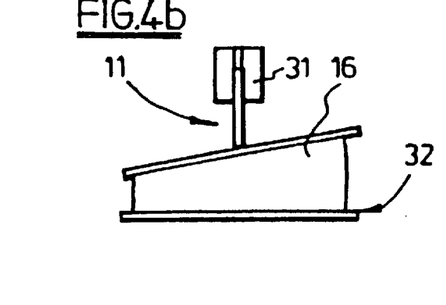

To migrate such effect, the support means may support the shoe body by way of the bracing web, which thereby forms the defined part of the shoe body, and with the web plane aligned perpendicularly to the width of the bearing surface. The forcing means causes the lining element to be sandwiched between platform and bearing surface with the initial constraining pressure acting by way of the lining element at their closest points somewhat reduced elsewhere across the width if the platform is not truly perpendicular to the plane of the web. During curing, the lining element is therefore permitted to expand to fill such gap or gaps before being inhibited by the constraining pressure and the resultant lining, although varying in thickness across the width of the platform and partly of uneven final density, nevertheless presents a major face that is perpendicular to the bracing web. FIGS. 4(a) and 4(b) are cross-sectional through such an arrangement, which is otherwise similar to FIG. 3(a), in which support of the web in relation to the bearing surface is effected and lack of perpendicularity between platform and bracing web is greatly exaggerated for illustrative purposes. FIG. 4(a) illustrates the situation before curing the resins and FIG. 4(b) afterwards.

The arrangement exemplified by 30 in FIG. 3(a) may take other forms, particularly in relation to accommodating one shoe body and restraining means in the form of a simple arcuate strip terminating at the locating points 35, 36. The forcing means may cause the support means to press the lining element against the relatively fixed bearing surface or alternatively, or additionally, may cause the locating points 35, 36 to move the bearing surface (or surfaces) towards the platform (or platforms).

It will be appreciated that notwithstanding the precise form of restraining means and forcing means, the arrangement has to receive a lining element that is shorter and narrower than the bearing surface and the platform. Most conveniently, by having the arrangement such that the (or one) bearing surface is disposed substantially horizontally and upwardly facing, with the forcing means arranged to move the shoe body vertically downwardly, the lining element may be stably positioned on the bearing surface centrally between its edges prior to it being sandwiched and thereafter held in constraint. Where as shown in FIG. 3(a) two shoe bodies are disposed back-to-back, the lining element associated with the upper shoe may be stably placed on the correspondingly horizontally disposed and upwardly facing platform.

If such orientation of the bearing surface and/or platform is not appropriate and/or it is not practicable to place the lining element or elements with sufficient precision, location means may be provided separately or as part of the support means, or possibly even the restraining means, to ensure the central disposition of the lining element prior to application of constraining pressure.

As indicated above, the formulation of the lining element may be varied to achieve particularly desired characteristics of the cured lining, as a result of which the lining element may have different physical properties prior to, and during, curing which may be used to advantage or have to be accommodated.

Figures 5, 6, 7:
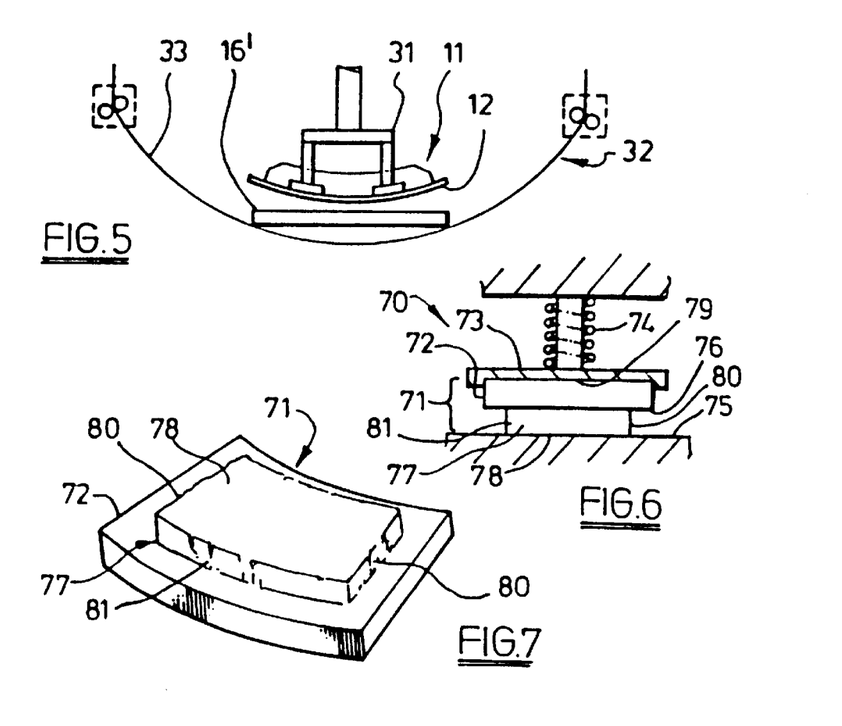
FIG. 5 is an elevation view of part of an arrangement, similar to FIG. 3(a) but showing the disposition of a shoe body having a cylindrically curved platform and flat lining element.
FIG. 6 is a schematic elevation view of an alternative arrangement in accordance with the present invention for manufacture of a bonded friction element in the form of a brake shoe employing a flat platform.
FIG. 7 is a partly cut away perspective view of a bonded flat shoe produced in a the arrangement of FIG. 6.

For example, if the rolled lining element material is sufficiently plastic for bending to be effected without radius rolling without damaging the structure, then it may be more convenient to prepare a substantially flat element, as shown at 16' in FIG. 6, and for the support means to support a shoe body platform spaced from the bearing surface 33 to permit interposition of the flat lining element, the forcing means then being arranged to move the platform and bearing surface relatively towards each other to cause the element 16' to conform to the curvature of the platform and then be sandwiched by the platform and bearing surface under a prescribed constraining pressure.

Whereas it is convenient to employ restraining means with a bearing surface that comprises an inextensible flexible strip readily caused to conform to the cylindrically curved shape of the platform and with a low thermal inertia that makes it suitable for subjecting to the temperature of the resin curing operation, it will be appreciated that the bearing surface may be provided by one or more solid blocks. It will be understood that with such a bearing surface the profile may be varied in the direction of curvature, and indeed, transversely thereto, whereby the lining element may be permitted to expand to a slightly greater extent towards the center of its length to vary the density and/or permit the cured lining to be ground to a high point at its center to facilitate bedding-in without having to remove excessive material from the end portions of the lining. Alternatively, or additionally, the surface of the lining may be conformity with a bearing surface profiled across its width or length produce a correspondingly profiled major face, analogous to the face conforming, and bonded, to the platform.

As indicated hereinbefore the term lining is used in this specification, notwithstanding that a lining as such may comprise a plurality of shorter blocks, and it will be understood that in each construction described above, the lining element may actually comprise a plurality of shorter element blocks with no significant effect.

Whereas the brake shoe has been described above as having a platform with cylindrically convex curvature that is intended to bear in operation against the interior of a cylindrical brake drum it will be understood that a brake shoe having a concave curvature intended to surround a braking surface may be formed by the method and an appropriate arrangement in which the bearing surface has as convex form.

Furthermore, it will be appreciated that a brake shoe made in accordance with the present invention does not require to have a platform that is curved cylindrically for use with a drum brake arrangement and may extend in a flat plane, such a shoe comprising what is more usually called a brake pad and commonly used in relation to a disc brake arrangement.

Referring to FIGS. 6 and 7, these show, respectively, a bonding arrangement 70 to similar to that of FIG. 3(a) for producing a flat brake shoe or pad and a flat shoe 71 produced by the arrangement. A shoe body comprises a flat backplate 72 which is supported by support means 73 and forcing means 74 facing a cooperative flat bearing surface 75 of greater extent than the platform. The platform carries a film 76 of uncured thermosetting resin adhesive and a substantially flat, plastic, rolled formed lining element 77 of appropriate density, thickness, length and width is sandwiched by the platform and bearing surface by way of major faces 78, 79 through which constraining pressure applied, minor faces 80, 81. The assembly is heated, the lining element being caused by the constraining pressure to decrease in thickness to a desired final thickness and density, whilst the area of the lining expands somewhat due to expansion at the unconstrained minor faces. As indicated above, for particular lining element formulation, constraining pressure, density change etc., the changes in length and width are consistent and accommodated after simple trial by choice of initial dimensions for the lining element. A lined shoe that results from the aperture is shown at 71 in FIG. 7. It will be appreciated that because the minor faces 80, 81 have been unconstrained the edges of the lining will be somewhat uneven or ragged but the effective area of the major face 77 can be formed within defined limits.

The bearing surface, although substantially flat to cooperate with the backplate, may possess surface features to define the thickness profile of the cured element.

It will be appreciated that because the lining element is cured with its minor faces unconstrained, if a particular peripheral shape is required in addition to overall major face area, it is readily possible to derive by trial a particular shape of green lining element which responds to the major face constraining pressure derived therefor to expand laterally during curing of the resin to define by the minor faces the lining of appropriate shape in addition to thickness and density.

The bearing surface, although substantially flat to cooperate with the backplate, may possess surface features to define the thickness profile of the cured element.

Whatever form taken by the platform and lining such a shoe may comprise a friction element employed in analogous manner in a clutch arrangement of a type wherein the inherently irregular or ragged periphery of the friction lining is tolerable. Likewise, other changes in accordance with the above discussion on values of initial constraining pressure may be effected to produce a lining which has the same or even less density than the green lining element.

I claim:

1. A method of manufacturing a bonded friction element comprising:
    a) producing a carrier having a platform;
    b) producing a plastic friction lining element including fibrous reinforcement and friction modifying materials in a matrix of an uncured thermosetting resin binder disposed between major faces defining its thickness and minor surfaces between and perpendicular to said major faces;
    c) rolling said friction lining element with said fibrous materials oriented between said major faces to define a predetermined rolled thickness and density;
    d) depositing a thermosetting adhesive resin on at least one of a major face of the lining or said platform;
    e) disposing one of the two major surfaces of the lining element adjacent said platform with said thermosetting adhesive between, and in contact with, the element and the platform;
    f) sandwiching the adhesive and lining element between the platform and a cooperative bearing surface bearing on the other one of said major faces, such that the minor surfaces are exposed;
    g) curing the resins of both the adhesive and lining element at an elevated temperature whereby the cured lining is rigid and bonded to the platform; and
    h) during said curing, applying constraining pressure to the lining element by way of said major faces, thereby further densifying and reducing the thickness of the lining element to a predetermined final density and a predetermined minimum final thickness for forming a cured bonded friction element.

2. A method as claimed in claim 1, wherein step c) comprises rolling of said friction lining element to have a uniform thickness greater than said predetermined minimum final thickness and density less than the predetermined final density.

3. A method as claimed in claim 1 wherein step c) comprises rolling the lining element to a density between 86% and 92% of theoretical maximum density.

4. A method as claimed in claim 1 wherein step h) further comprises causing said constraining pressure to vary as a function of said pre-determined rolled thickness.

5. A method as claimed in claim 4 and further causing said constraining pressure to decrease from an initial constraining pressure, applied to the lining element at its predetermined rolled thickness, to a final value at said predetermined minimum final thickness insufficient to further decrease the lining thickness.

6. A method as claimed in claim 1 wherein step h) comprises applying a constraining pressure to the lining element in the range 0.1–0.34 MPa (15–50 psi).

7. A method as claimed in claim 6 wherein step h) comprises applying a constraining pressure to the friction lining element in the range 0.17–0.2 MPa (25–30 psi) and heating the lining element and adhesive for an interval in the range 20 to 40 minutes at a temperature in the range 220°–250° C.

8. A method as claimed in claim 1 wherein step h) comprises constraining said other one of the major faces by way of a bearing surface of greater dimension than the friction lining element in a direction transverse to said predetermined rolled thickness.

9. A method as claimed in claim 1 wherein step e) comprises disposing the friction lining element adjacent a cylindrically curved platform of a brake shoe body such that the length of the lining element conforms to the curvature of the platform, and wherein step h) comprises applying said constraining pressure to said other one of the major faces of the element by way of a bearing surface comprising a part of a flat strip of flexible inextensible material, supported at spaced apart locations to form said bearing surface of cooperative curvature, intermediate the support locations and urging said shoe body and strip relatively towards each other.

10. A method as claimed in claim 9 wherein step c) comprises radius rolling the friction lining element to provide a natural curvature at ambient temperature substantially in conformity with the curvature of the cylindrically curved platform.

11. A method as claimed in claim 1 wherein step c) comprises rolling the friction lining element as a substantially flat sheet, disposing the flat sheet element between the platform and said bearing surface and exerting force on opposite major surfaces of the sheet element by way of said platform and bearing surface.

12. A method as claimed in claim 1 wherein step a) comprises manufacturing the carrier and coating the platform at manufacture with a film of protective primer comprising said uncured adhesive resin dried to touch at ambient temperature.

13. An arrangement for producing a bonded friction element in which a friction lining is secured to a carrier platform by bonding, comprising:
    support means arranged for supporting the platform;
    restraining means including a bearing surface arranged to face said platform and hold one of a pair of major faces of the friction lining against the platform by way of a layer of thermosetting adhesive resin by bearing against the other of the pair of major faces of the friction lining, said restraining means cooperating in bearing relationship with said bearing surface, said friction lining being formed of an uncured thermosetting resin matrix containing reinforcement fibers and friction modifying materials roll formed to define a predetermined density and thickness between the major faces;

forcing means for applying a relatively small bias force between the platform and bearing surface of the restraining means to press the friction lining, adhesive resin and platform into contact over the major faces of the friction lining, said forcing means being arranged for inducing a constraining pressure on the major faces of the friction lining and, during curing of the thermosetting resins of the adhesive and friction lining in situ on the platform, constraining the thickness of the friction lining, thereby further densifying and reducing the thickness of the lining element to a predetermined final density and a predetermined minimum final thickness; and heating means for heating at least the platform, adhesive resin and friction lining pressed by said forcing means to a predetermined temperature for a predetermined time to effect curing of the adhesive resin and bonding of the friction lining to the platform, said heating means being arranged to heat the platform, adhesive resin and friction lining to a temperature and for a time appropriate for curing the resins of both the adhesive and the friction lining element.

14. An arrangement as claimed in claim 13 in which the forcing means is arranged to provide said bias force such that a pressure generated on the major faces of the friction lining increases as a function of said pre-determined rolled thickness.

15. An arrangement as claimed in claim 13 in which the forcing means is arranged to generate by said small bias force an initial pressure in the range 0.1–0.34 MPa (15–50 psi).

16. An arrangement as claimed in claim 13 in which the heating means is arranged to heat the platform, adhesive resin and friction lining to a temperature in the range 220° to 250° C. for a time interval in the range of 20 to 40 minutes.

17. An arrangement as claimed in claim 13 in which the support means is arranged for receiving a carrier comprising a brake shoe body having a cylindrically curved platform and the friction lining is arranged to have a cylindrical curvature co-operative with said platform.

18. An arrangement as claimed in claim 17 in which the bearing surface comprises a flexible inextensible strip supported at spaced apart locations to define therebetween an arc of a circle of length greater than the friction lining and radius corresponding to the radius of said other major face of the friction lining.

* * * * *